3,153,786
MOVING TARGET INDICATOR CANCELLER
Roy E. Byington, Sudbury, Mass., assignor, by mesne assignments, to the United States of America as represented by the Secretary of the Army
Filed Nov. 6, 1959, Ser. No. 851,320
3 Claims. (Cl. 343—7.7)

This invention relates to moving target indicating system cancellers and, more particularly, to a canceller for controlling pulse frequency rate and amplification of video in the cancellation circuit to insure proper coincidence matching of delayed and undelayed video and proper cancellation of stationary target video signals.

One type of moving target indicating system employs a radio frequency (RF) transmitter pulsed by triggers from a pulse repetition frequency (PRF) generator. Each time the transmitter, which may be, for example, a magnetron, is pulsed, a burst of radio frequency energy is radiated by an antenna system and its echo from a target is detected. The phase of the echo RF will differ from the phase of the transmitted RF and this phase difference will vary directly as the distance to the target. If the target is moving, there will be an additional phase difference and the total phase difference will change continually so long as the target is moving radially with respect to the antenna system. Consequently, when the target is not moving radially with respect to the antenna system the phase difference between successive bursts of RF and their echos from a given target will be the same. On the other hand, when the target is moving radially with respect to the antenna the successive phase differences will be different. A moving target indicating system (MTI system) operating in accordance with the above principle is described on page 632 of Radar Systems Engineering, by Ridenour, vol. 1 of the M.I.T. Radiation Lab. Series.

In one such MTI system described in the above reference, the phase difference between transmitted and echoed or received RF is obtained by mixing both with the output from a single local oscillator to produce transmitted and received intermediate frequencies denoted transmitted and received IF. Some such systems employ magnetron transmitters which do not preserve phase relationship between successive bursts of radio frequency and, consequently, the phase difference between transmitted and received RF can only be obtained by maintaining a memory of the phase of the previously transmitted RF burst. For this purpose a coherent IF oscillator is provided which is locked in phase with the transmitted IF and continues to produce transmitted IF between transmitted bursts which may be phase compared with the received IF. As a result of this phase comparison, target video pulses are produced in time coincidence with the echoed or received RF and changes in amplitude of successive target video pulses from a given target are representative of target radial motion.

Heretofore the successive video pulses representative of echoed RF from a given target have been amplitude compared in a cancellation circuit and the output of this cancellation circuit employed to control a PPI display. When the successive video pulses from a given target are the same amplitude, the target is not indicated on the display because it is presumed that the target is stationary. On the other hand, when the amplitudes are different, it is presumed that the target is moving and, therefore, the target's position is displayed.

One cancellation system is described on page 634 of the mentioned reference and includes dual electrical paths to which are fed the target video pulses. One path delays the pulses more than the other by an interval equal to the interval between bursts of transmitted RF. Consequently, the output from these two electrical paths at the same instant consists of successive video pulses from the same target thereby permitting time coincident amplitude comparison of successive video pulses. Where such a comparison indicates equal amplitudes, the target is presumed to be stationary and where it indicates unequal amplitudes it is presumed the target is moving.

It is important in such cancellation systems that the video pulses undergo the same amplification or attenuation in each of the two electrical paths so that the original relationship between amplitudes of successive video pulses are maintained. It is also important that the delay be precisely equal to the PRF of the transmitter in order that precise time coincidence of successive video pulses at the outputs of the two electrical paths be obtained. If these features are not maintained, the distinction between moving and stationary targets will degenerate.

The delay lines employed in such cancellation systems are often subject to change because of ambient temperature changes. Thus, if the transmitter PRF is constant and the delay is altered because of temperature or other changes, the precise time coincident between successive video pulses at the outputs of the two electrical paths deteriorates. In the past this has been remedied by employing a second identical delay line in a separate closed loop system for properly spacing and controlling the transmitter PRF. In such a system employing two identical delay lines, ambient temperature changes cause compensating changes in the transmitter PRF and the delayed video pulses and the precise time coincidence is not lost. Such prior systems are capable of compensating for changes in the delay line only insofar as the two delay lines are identical and respond in precisely the same manner to temperature changes and to any other effects which may alter the delays.

Some prior systems employ a quartz delay line energized by a delay amplifier having automatic gain control (AGC) coupled thereto. In such systems target video modulates the IF carrier, producing a continuous wave of modulated carrier which is applied to the delay line. The AGC operates to maintain the continuous wave carrier signal level through the delay line at a precise output level to insure proper cancellation of video from stationary targets. However, the D.C. output level of this delay results from the sum of the continuous wave carrier plus spurious reflections of said carrier, called secondaries, which are produced within the quartz delay line. These secondaries vary unpredictably with ambient temperature and other factors. Therefore, the D.C. level output of the delay amplifier should not be used as a reference level if precise cancellation is to be maintained. It is one object of this invention to add a reference signal to the target video and to sample this reference signal only, thereby rejecting target video and substantially all secondaries from target video and the reference signal and to employ the sampled signal to control said AGC.

It is another object of this invention to provide an MTI system having none of the above mentioned limitations.

It is another object to provide means for controlling cancellation delay line amplification and the PRF of an MTI system to insure proper cancellation of stationary target video.

It is a further object to provide such a system employing only a single delay line.

It is another object to provide an MTI cancellation system having means for preventing erroneous triggering of the timing circuitry by echoes from targets beyond the intended range of the radar.

It is a feature of this invention to provide an MTI system having a delay line cancellation circuit the delay line forming a closed loop with a reference or pilot pulse generator, said closed loop also including a variable delay and gain control with means responsive to the output of said cancellation circuit for controlling said variable delay and said gain control with means coupling the output of said reference pulse generator to the MTI transmitter to thereby control PRF.

It is another feature to provide gating means at the input to the cancellation system controlled by a range gate pulse which is generated in response to said reference pulses.

It is another feature to provide a modulator coupling target video to the cancellation circuit and to apply the reference pulses to the modulator and to further apply a suitable IF frequency to the modulator for modulation therein.

It is another feature to sample the output of the cancellation circuit during the interval between maximum range and the transmitter trigger and to employ this sampled output for controlling gain in the delay line and for controlling the above mentioned variable delay.

Other further features and objects of this invention will be more apparent from the following specific description taken in conjunction with the drawings in which.

Figure 1:
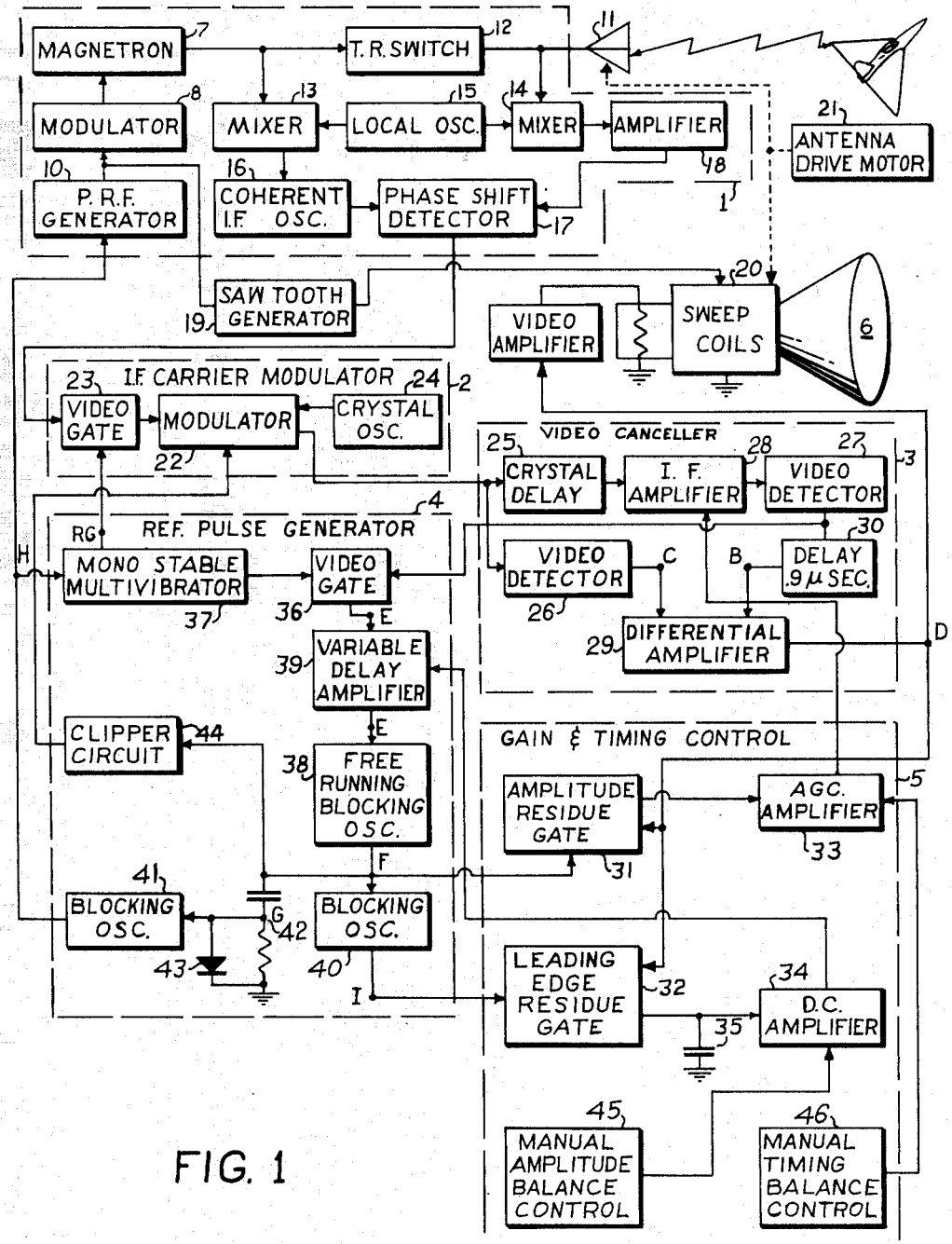
FIG. 1 depicts a block diagram of a coherent MTI system including a reference pulse generator and gain and timing control coupled to the canceller and system transmitter.

Turning first to FIG. 1 there is shown a block diagram of one embodiment of this invention including a coherent MTI radar system 1, IF carrier modulator 2, video canceller 3, reference pulse generator 4 and AGC and timing control 5. These units all operate to detect the range of moving targets and to indicate said targets on a PPI type display as represented by cathode ray tube 6. Radar system 1 operates preferably as described on page 632 of the mentioned reference and includes, for example, magnetron 7 operating in conjunction with modulator 8 and PRF generator 10 to produce bursts of radio frequency at substantially regular intervals which are applied to antenna system 11 via a transmit-receive switch 12. The transmitted RF from magnetron 7 is also applied to mixer 13 and the RF echo from illuminated targets detected by antenna system 11, is applied to mixer 14. Mixers 13 and 14 are also fed frequency signals from local oscillator 15 and are preferably carrier suppressed single sideband mixers. The output from mixer 13, denoted transmitted IF, is applied to coherent IF oscillator 16 and controls the frequency of that oscillator so that oscillator 16 continues to produce a transmitted IF signal in phase with the burst of IF from mixer 13 even after the output from mixer 13 has ceased, such as occurs between pulses of RF from magnetron 7. The output of coherent IF oscillator 16 and the output of mixer 14 are applied to phase shift detector 17. Amplifier 18 coupling mixer 14 to detector 17 further attenuates carrier frequency and undesirable sidebands and amplifies the desirable sideband.

A sawtooth sweep generator 19 responsive to pulses from PRF generator 10 energizes the deflection coils 20 of cathode ray tube 6 while antenna drive motor 21 rotates said coils in synchronism with rotation of antenna system 11.

The output of phase shift detector 17 consists of target video pulses. In this output successive pulses echoed from a given target vary in amplitude when that given target is moving and are equal in amplitude when the given target is stationary. These pulses are applied to IF carrier modulator 2 where they modulate an IF frequency suitable for delay in a quartz delay line without suffering distortion. Reference or pilot pulses are also applied to carrier modulator 2 and also modulate the carrier frequency.

Outputs from carrier modulator 2 consisting of target video and pilot pulses are applied to video canceller 3 which includes a crystal delay line. The output of canceller 3, consisting of moving target video, controls the PPI display on CRT 6. The delayed video and reference pulses are detected in canceller 3 and gated in reference pulse generator 4 so as to gate out the video and admit only the reference pulses and these reference pulses trigger blocking oscillators in generator 4 which in turn trigger PRF generator 10 in radar system 1.

The cancelled output from video canceller 3 is sampled during the interval of the reference pulses, by residue gates. These gates are controlled by pulses substantially in time synchronism with the reference or pilot pulses and one of these gates controls the AGC system in video canceller 3 while the other controls a variable delay in reference pulse generator 4 which, effectively, increases or decreases the interval between reference pulses. The primary purpose of the AGC control applied to canceller 3 is to insure that amplification or attenuation of delayed video and pilot pulses, applied to the cancelling circuit therein, is the same as the amplification or attenuation of nondelayed video and pilot pulses applied to the same cancelling circuit. On the other hand, the variable time delay control generated in control 5 is to insure that the interval between pilot pulses is precisely equal to the above-mentioned delay in canceller 3. Since these pilot pulses also establish the PRF of radar system 1, the precise time coincidence of successive video pulses from a given target at the cancelling circuit in canceller 3 is insured.

Figure 2:
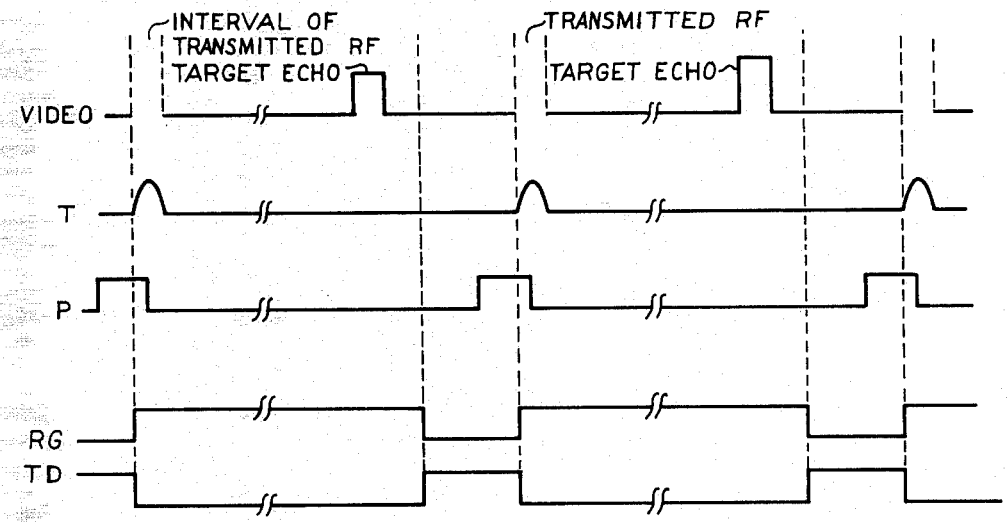
FIG. 2 depicts waveforms by which to gain an understanding of the general operation of the system shown in FIG. 1.

In FIG. 2 there is shown waveforms, the first of which is denoted "video" and depicts the interval of transmitted RF and the resulting video pulses from a given target as represented by the output from phase shift detector 17. It should be noted that these video pulses in the waveform are of different amplitude indicating that the target is moving. The next waveform, denoted T, represents triggers from a blocking oscillator 41, in reference pulse generator 4, which triggers PRF generator 10. The triggers are in time coincidence with the transmitted RF. Waveform P depicts pilot pulses applied to the cancelling circuit in canceller 3 and waveform RG shows range gate pulses for gating the target video input to carrier modulator 2. It should be noted that the pilot pulses shown in waveform P fall substantially between the range gate pulses in waveform RG.

Figure 3:
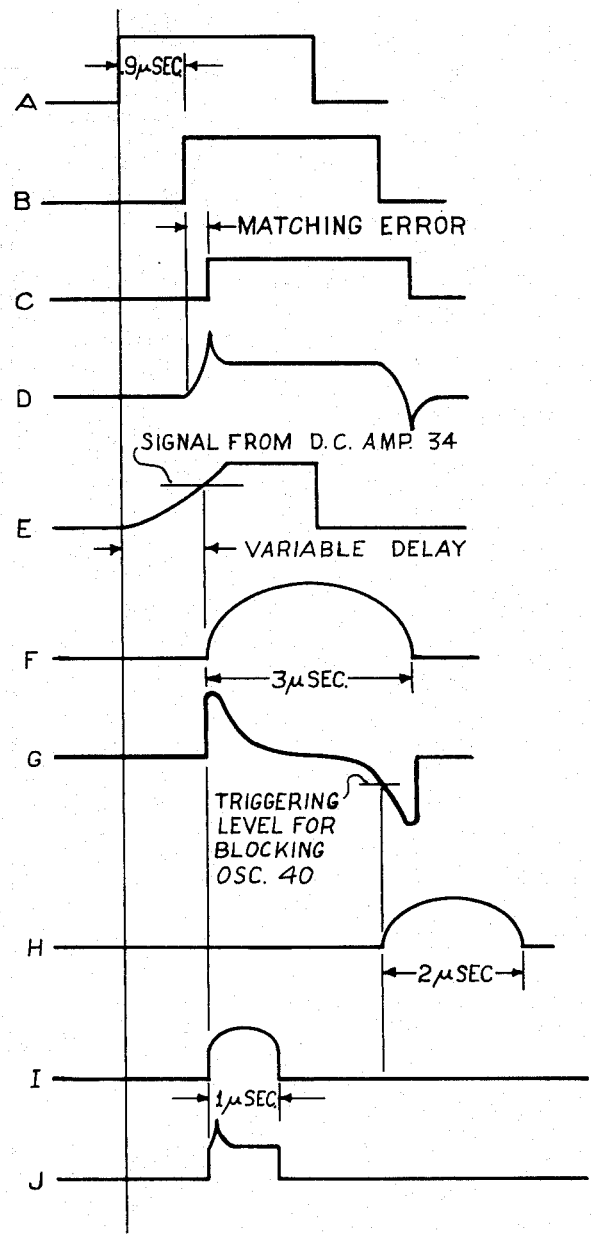
FIG. 3 depicts waveforms by which to gain an understanding of the operation of the reference pulse generator and the gain and timing control included in FIG. 1.

Consider next the details of FIG. 1 taken in conjunction with waveforms of FIG. 3. The output of phase shift detector 17 consisting of target video pulses is applied to modulator 22 via range gate 23. Modulator 22 is also fed reference or pilot pulses from pulse generator 4 and both these reference pulses and the target video pulses modulate the output from crystal oscillator 24. The frequency of oscillator 24 is preferably suitable for delay by a crystal delay line with a minimum of distortion. The output of modulator 22 is fed to crystal delay 25 and to video detector 26 and the output of delay 25 is applied to video detector 27 via a suitable IF amplifier 28. The outputs of detector 26 and 27 consisting of delayed and undelayed target video and pilot pulses are applied to differential amplifier 29. A very small delay is inserted in the line between detector 27 and differential amplifier 29 to impose an additional delay to the video therein for reasons that will be apparent subsequently. The input and output of delay 30, when video gate 23 is closed, consists of pilot pulses only. One of these pilot pulses is represented in waveforms A and B of FIG. 3 where it is seen that pulse B at the output of delay 30 is delayed .9 microsecond with respect to pulse A at the input to delay 30. The output of video detector 26 is represented by pulse waveform C which is purposely shown as being out of time coincidence and of a different amplitude than the pulse in waveform B. Consequently, the output of differential amplifier 29 will appear essentially as shown by waveform D. The leading edge of waveform D is a spike and the center of this waveform is at a positive level indicating that the delay in canceller 3 is not precisely equal to the interval between pulses from PRF generator 10, and, furthermore, amplification or attenuation in the delay path of canceller 3 is not equal to amplification or attenuation in the undelayed path in canceller 3.

The output of differential amplifier 29, as represented by waveform D, is applied to amplitude residue gate 31 and leading edge residue gate 32. Gate 31 serves to detect the D.C. level of pulses shown in waveform D while gate 32 detects the spike at the leading edge of pulses such as shown in waveform D. Gate 31 is controlled by a pulse shown in waveform F while gate 32 is controlled by a pulse shown in waveform I. Each of these control pulses is generated by different blocking oscillators in generator 4 which are triggered at substantially the same instant.

The output of gate 31 is applied to AGC amplifier 33 which controls IF amplifier 28 in video canceller 3 while the output of gate 32 is applied to D.C. amplifier 34. A smoothing capacitance 35 is coupled to the input of amplifier 34 to attenuate the higher frequencies in the pulse output of gate 32. Consequently, the output of D.C. amplifier is substantially a D.C. signal at a level representative of the magnitude of the gated signal from gate 32 shown in waveform J. This D.C. level is applied to variable delay amplifier 39 to which is also applied gated reference pulse video from gate 36. This gated reference pulse video is somewhat distorted because of the nature of the gate signal from multivibrator 37. Consequently, while the input to video gate 36 is as represented by waveform A, the output of video gate 36 is as represented by waveform E and this output combined with the D.C. level from D.C. amplifier 34, also shown in waveform E, triggers free running blocking oscillator 38. As can be seen, changes in the D.C. level from amplifier 34 will produce triggers to blocking oscillator 38 which vary in time relative to pulses at A. For this purpose, video gate 36 might be a pentode having the output of video detector 27, represented by waveform A, coupled to its control grid and the output of monostable vibrator 37 coupled to its suppressor grid, thereby producing waveform E at the plate of said pentode. Furthermore, variable delay amplifier 39 might be a triode having its control grid coupled to the plate of said pentode and biased by the output of D.C. amplifier 34, said triode being chosen to conduct when both said signal and bias are substantially equal in absolute magnitude and thereby trigger free running blocking oscillator 38. The output of blocking oscillator 38 represented by waveform F is applied to blocking oscillator 40 whose output is represented by waveform I. Oscillator 38 also triggers blocking oscillator 41 via a differentiating circuit 42. The output of circuit 42 is represented by waveform G. Diode 43 coupling the output of circuit 42 to ground serves to short out the positive part of waveform G and blocking oscillator 41 is, therefore, triggered by the negative part of that waveform. The triggering level of blocking oscillator 41 is set for trigger at, preferably, .4 microsecond before the trailing edge of the pulse output from oscillator 38. The output from oscillator 41 is represented by waveform H and is applied to multivibrator 37 and to PRF generator 10 serving as control.

The output of blocking oscillator 38 represented by waveform F is also clipped by clipper circuit 44 and applied to modulator 22 thus forming a regenerative closed loop for the reference or pilot pulses. This loop consists of blocking oscillator 38, clipper 44, modulator 22, crystal delay 25, IF amplifier 28, video detector 27, video gate 36 and variable delay amplifier 39 which triggers oscillator 38. The interval of one complete circulation of a pulse in this loop is precisely equal to the PRF interval of the transmitter since the transmitter is triggered by the output of the loop. For this reason the delay 30 of .9 microsecond is inserted in the delay path of video canceller 3. During perfect time coincidence of delayed and undelayed video pulses applied to differential amplifier 29, the interval of the above-described loop is precisely equal to the delay of crystal delay 25, IF amplifier 28, detector 27 and delay 30.

In order to allow proper adjustment for time balance and amplitude balance to thereby insure precise cancellation of the pilot pulses and of the target video pulses, manual controls 45 and 46 are provided. Control 45 controls the operating point of D.C. amplifier 34 and control 46 controls the operating point of AGC amplifier 33.

Figure 4:
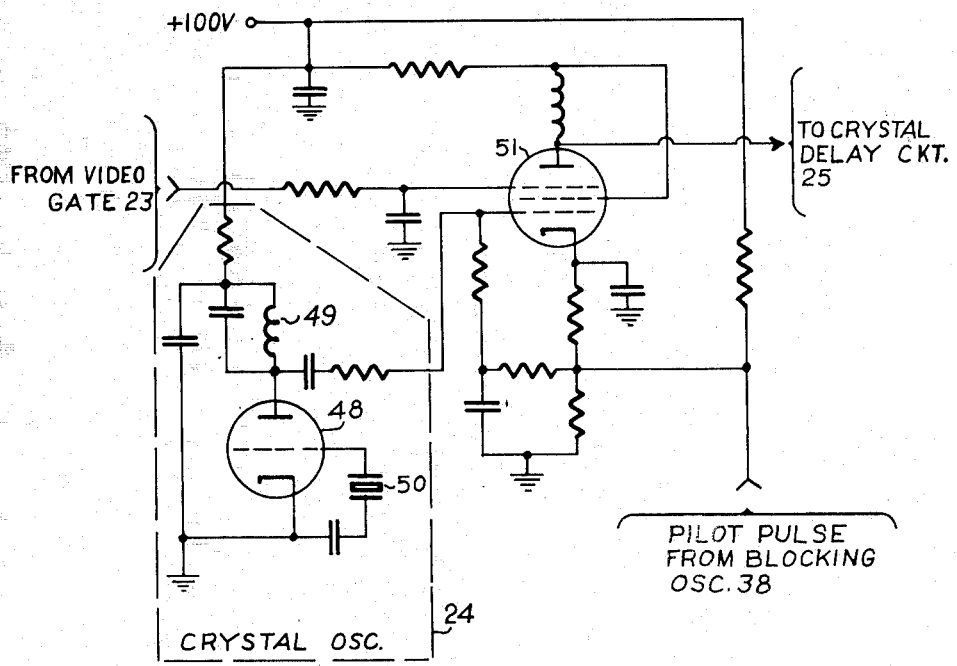
FIG. 4 depicts a modulator suitable for the system shown in FIG. 1.

In FIG. 4 there is shown the circuit details of modulator 22 and crystal oscillator 24. Oscillator 24 might, for example, consist of a triode 48 with a tuned circuit 49 coupling plate to cathode and a crystal 50 coupling cathode to grid. Modulator 22 might consist of a pentode 51 having its control grid coupled to tuned circuit 49, and to the output of clipper circuit 44 with the suppression grid being controlled by video pulses from gate 23.

Although there is described above an embodiment of this invention employing a particular type modulator for adding reference or pilot pulses to the video circuits of the canceller, blocking oscillators for generating pulses of given widths which control gates for sampling different portions of the cancelled pilot pulses, a particular type variable delay for spacing pilot pulses and thereby controlling system PRF and the output of the canceller is applied to a cathode ray tube PPI display, it is to be clearly understood that these circuits and devices are described only by way of example and do not limit the spirit or scope of the invention as set forth in the accompanying claims.

What is claimed is:
1. A moving target indicating system comprising:
 (a) a radar system including a pulse repetition frequency generator for controlling the time interval between pulses transmitted by said radar system;
 (b) An IF carrier modulator connected to and responsive to the output of said radar system for providing a signal modulated by the output signal from said radar system;
 (c) a cancellation circuit including first and second channels for providing delayed and undelayed signals, said first channel including a fixed delay line connected to the output of said modulator and a gain control means connected to said fixed delay line, said second channel having an input connected to the output of said modulator, said cancellation circuit also including a differential amplifier connected to said first and second channels for providing a cancellation circuit output signal;
 (d) A variable delay amplifier;
 (e) means for coupling said variable delay amplifier to the output of said fixed delay line;
 (f) means further coupling said variable delay amplifier to the output of said cancellation circuit; and
 (g) pulse generating means having its input coupled to and responsive to said variable delay amplifier and having its output coupled to said pulse repetition frequency generator.

2. A moving target indicating system comprising:
 (a) means for transmitting and receiving pulses of electromagnetic wave energy producing video pulses representing targets;
 (b) a cancellation circuit including first and second channels coupled to said receiving means for providing delayed and undelayed signals, said first channel including a fixed delay line responsive to the received pulses and a gain control means connected to said fixed delay line, said cancellation circuit also including a differential amplifier connected to said first and second channels for providing a cancellation circuit output signal;
(c) means generating gating signals;
(d) a variable delay amplifier;
(e) gating means connected to said gating signal generating means and responsive to said gating signals for coupling the output of said fixed delay line to said variable delay amplifier;
(f) pulse generating means connected to and responsive to the output of said variable delay amplifier;
(g) means coupling the output of said cancellation circuit to said variable delay amplifier for control thereof; and
(h) means coupling the output of said pulse generating means to said transmitting means and to said gating signal generating means whereby the pulse rate frequency of the transmitted pulses is controlled in response to the output of said cancellation circuit.

3. A moving target indicating system comprising:
(a) a transmitter for transmitting pulses of electromagnetic wave energy;
(b) a receiver for receiving reflected energy as a result of said pulses;
(c) an antenna connected to said transmitter and receiver;
(d) a pulse repetition frequency generator connected to said transmitter for controlling the repetition rate at which said pulses are transmitted;
(e) an intermediate frequency carrier modulator circuit comprising a video gate circuit connected to the output of said receiver, a modulator circuit connected to the output of said video gate circuit and a crystal oscillator having its output connected to said modulator;
(f) a video canceller comprising first and second channels and a differential amplifier, said first channel including a first delay line having its input connected to the output of said modulator, an intermediate frequency amplifier connected to said first delay line, a video detector connected to the output of said amplifier and a second delay line connected to the output of said video detector, said second channel including a second video detector, having its input connected to the output of said modulator, outputs of said second delay line and said second video detector being connected to said differential amplifier whereby a video canceller output signal is produced at the output of said differential amplifier;
(g) first and second residue gate circuits connected to the output of said differential amplifier, said first residue gate having an output circuit connected to an automatic gain control amplifier having its output connected to said intermediate frequency amplifier, and said second residue gate circuit having an output connected to a D.C. amplifier; and a
(h) reference pulse generator comprising a monostable multivibrator having an output connected to said video gate circuit, a second video gate circuit having a first input connected to a second output of said multivibrator and to a second input connected to the output of said video detector in said first channel, a variable delay amplifier having a first input connected to the output of said second video gate circuit and a second input connected to said D.C. amplifier, a first blocking oscillator having its input connected to said variable delay amplifier and its output connected to said first residue gate circuit, a second blocking oscillator having its input connected to said first blocking oscillator and its output connected to said second residue gate circuit, a clipper circuit having its input connected to the output of said first blocking oscillator and its output connected to said modulator, and a third blocking oscillator, having its input connected to the output of said first blocking oscillator and its output connected to said multivibrator and to said pulse repetition frequency generator.

References Cited in the file of this patent
UNITED STATES PATENTS

| | | |
|---|---|---|
| 2,532,546 | Forbes | Dec. 5, 1950 |
| 2,730,711 | Varela | Jan. 10, 1956 |
| 2,740,963 | Shuler et al. | Apr. 3, 1956 |